United States Patent [19]

Drexel et al.

[11] 4,396,223
[45] Aug. 2, 1983

[54] WINDOW FOR MOTOR VEHICLE

[75] Inventors: Heinrich Drexel, Sindelfingen; Klaus Sotzko, Herrenberg, both of Fed. Rep. of Germany

[73] Assignee: Daimler-Benz Aktiengesellschaft, Fed. Rep. of Germany

[21] Appl. No.: 241,368

[22] Filed: Mar. 6, 1981

[30] Foreign Application Priority Data

Mar. 6, 1980 [DE] Fed. Rep. of Germany ....... 3008552

[51] Int. Cl.³ .............................................. B62D 25/02
[52] U.S. Cl. ..................................... 296/201; 52/397; 296/84 D; 296/93; 296/213
[58] Field of Search ............. 296/93, 79, 84 R, 84 A, 296/84 D, 90, 200, 201, 210, 213; 52/208, 397, 400, 716, 718, 717

[56] References Cited

U.S. PATENT DOCUMENTS

| | | |
|---|---|---|
| 2,976,972 | 3/1961 | Raymond ............................... 52/717 |
| 3,118,701 | 1/1964 | Peras ..................................... 296/213 |
| 3,228,156 | 1/1966 | Hitzelberger ......................... 52/397 |
| 3,550,950 | 12/1970 | Pollock ................................. 296/213 |
| 4,036,522 | 7/1977 | DeRees et al. ....................... 296/210 |
| 4,304,435 | 12/1981 | Everts et al. ......................... 296/213 |

FOREIGN PATENT DOCUMENTS 2044833 10/1980 United Kingdom ................. 52/717

Primary Examiner—Robert R. Song
Assistant Examiner—Dennis Pedder
Attorney, Agent, or Firm—Craig & Burns

[57] ABSTRACT

A window arrangement for motor vehicles, especially a rear window wherein a window pane, through an adhesive connection, is held at an opening formed by flanges connected by spot welding. The flanges form a part of at least an outer covering of a vehicle such as, for example, an outside sheathing of the roof, and an inside closing sheet or portion of a roof frame or similar device. The adhesive connection is covered by a moulding and the flanges are extended or lengthened beyond the spot welded connection in a direction of the opening. A free end of at least the upper flange is bent to an outside behind the spot weld connection but at a position forwardly of the adhesive connection.

8 Claims, 1 Drawing Figure

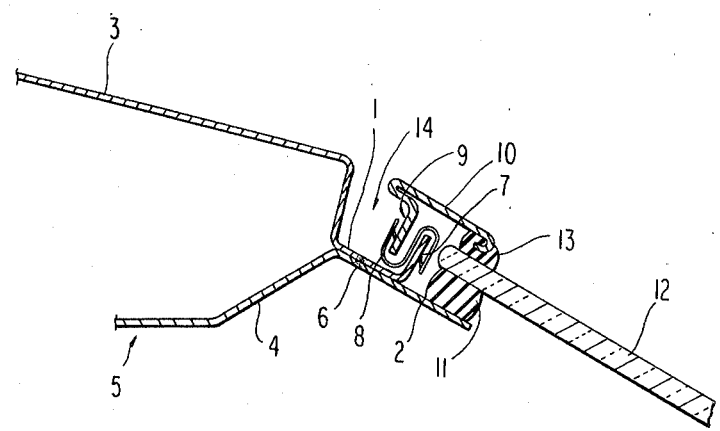

WINDOW FOR MOTOR VEHICLE

The present invention relates to a window construction and, more particularly, to a window for motor vehicles, especially a rear window of a motor vehicle, wherein a pane of glass forming the window is held, by way of an adhesive connection, covered by a moulding or the like, in an opening of a body of the motor vehicle which is formed by spot weld connected flanges of at least an outer covering such as, for example, an outside sheeting of the roof, and an inside closing panel or sheet of a roof frame or similar device.

In window constructions of the aforementioned type it has been proposed that the spot welded flanges rest on each other over their entire length and that an adhesive connection be located in an area of the spot welding. A disadvantage of such proposals resides in the fact that, in an area of the welding spots, the flanges have an irregular surface thereby resulting in considerable difficulties with regard to ensuring an absolutely waterproof development of the adhesive connection of the window pane.

A further disadvantage of the above-noted constructions resides in the fact that the molding mounting that covers the adhesive connection also is somewhat difficult because certain preparations must be made for this purpose at the body of the motor vehicle such as, for example, mounting the holding clips which result in an increase in the danger of corrosion of the motor vehicle body in the area of the moulding.

A further disadvantage of the above proposed constructions resides in the fact that it is often necessary to fashion a moulding in such a manner that parts of the moulding may serve for catching and draining off of rain water or the like which, on the one hand, means that the moulding would be more expensive to manufacture. Moreover, for aerodynamic reasons, the moulding construction would be somewhat more complex or difficult since it is desirable for a transition from the roof surface to the surface of the pane of glass to be as flush as possible.

The aim underlying the present invention essentially resides in providing a window construction for motor vehicles which enables a waterproof insertion or mounting of a pane of glass forming the window in addition to enabling the use of a moulding which functions as an efficient drain for rainwater or the like and which may be simply mounted onto the motor vehicle.

In accordance with advantageous features of the present invention, a window for motor vehicles is provided wherein flanges formed by at least the outer covering of the vehicle and an inside covering or panel of a roof frame or the like are extended or lengthened beyond the spot-welded connection in a direction toward the opening of the motor vehicle body which is adapted to accommodate the pane of glass forming the window, with a free end of at least an upper flange being bent to the outside of the vehicle behind the spot welded connection but forwardly of the adhesive connection.

In accordance with advantageous features of the present invention, the bent flange portion is adapted to serve as a mounting for the moulding of the window pane assembly. This may be achieved in an especially advantageous manner by pushing a holding clamp or the like on the bent flange part whereby the holding clamp interacts with a bent base part of the moulding so as to secure the moulding in its position.

In accordance with further advantageous features of the present invention, an elastic sealing means is pushed over a free end of the moulding that reaches over an edge of the pane of glass forming the window, with the sealing means resting on the pane of glass.

Accordingly, it is an object of the present invention to provide a window for a motor vehicle which avoids, by simple means, shortcomings and disadvantages encounted in the prior art.

Another object of the present invention resides in providing a window for a motor vehicle which ensures a watertight or waterproof mounting of the window at a body of the motor vehicle.

A further object of the present invention resides in providing a window for a motor vehicle which enables the development of an optimum aerodynamic transition between a surface of the roof of the vehicle and a pane of glass forming the window.

Yet another object of the present invention resides in providing a window pane for a motor vehicle which minimizes if not avoids the dangers of corrosion or rust in an area of the mounting of the window at the vehicle.

A still further object of the present invention resides in providing a window for a motor vehicle which is simple in construction and therefore relatively inexpensive to manufacture.

These and other objects, features, and advantages of the present invention will become more apparent from the following description when taken in connection with the accompanying drawing which shows, for the purpose of illustration only, one embodiment in accordance with the present invention, and wherein:

The single FIGURE of the drawing is a partial longitudinal cross sectional view of a window mounting arrangement constructed in accordance with the present invention.

Referring now to the single FIGURE of the drawing, according to this FIGURE, an outside covering or sheeting 3 of a roof panel is provided with a bent or stepped flange 1 and an inner closing panel or sheeting 4 is provided with a bent flange 2, with the flanges 1, 2 defining or limiting an opening for accommodating a window pane forming a rear window of a motor vehicle. The flanges 1, 2 are connected with each other by spot weld connection. The flange 1, at a position behind the spot weld connection 6, is bent upwardly toward the outside of the vehicle so as to form a bent flange 7. A moulding 10 is provided with a bent base part of portion 9 with a holding clamp 8 being pushed or pressed onto the bent flange 7 and interacting with the bent base portion 9 so as to secure the moulding 10 in a mounted position. An edge area of a pane 12 forming the window rests on a free end of the flange 2 with an adhesive connection being interposed between an upper surface of the free end of the flange 2 and the pane 12. By virtue of the disposition of the adhesive connection 11, such connection is disposed in an area of the flange 2 which has no deformations or uneveness which is caused by the spot welded connection 6 so that an absolute watertightness of the mounting means for the pane 12 is ensured.

An elastic sealing means 13 is pushed over a free end of the moulding 10 that extends over an edge of the pane 12 for the purpose of preventing water or the like from flowing from a rain drain generally designated by the reference numeral 14. Moreover, by virtue of the above-noted constructional features of the present invention, not only is an optically pleasing mounting provided but also an aerodynamic and technically satisfactory joint is achieved.

As shown most clearly in the single FIGURE of the drawing, by virtue of a lengthening of the flanges, it is not necessary to take any special measures or provide any additional parts for the window mounting of the present invention to enable a formation of the rain drain 14 since such drain 14 is formed merely by a fashioning of the flange 1 in the manner illustrated.

While we have shown and described only one embodiment in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

We claim:

1. A window arrangement for a motor vehicle comprising means for forming an outer covering of the vehicle, means for forming an inner member of the vehicle, a flange provided on each of the forming means for defining an opening for accommodating a window pane, the flanges are disposed one above the other and are connected to each other by a spot weld, the flanges extend beyond the spot weld parallel to the direction of the window pane, a free end of the uppermost flange is bent outwardly of the vehicle behind the spot weld but in front of an adhesive connection means interposed between the flange of said inner member and the window pane, a moulding means is provided for covering the adhesive connection means, and means are provided for connecting the moulding means to the bent free end of the upper flange.

2. The arrangement according to claim 1, wherein the connecting means is a holding clamp extending over the bent free end of the upper flange and cooperating with a portion of the moulding to secure the moulding in position.

3. The arrangement according to claim 2, wherein portion of the moulding is a bent base portion.

4. The arrangement according to claim 3, wherein a sealing means is mounted on a free end of the moulding and rests on the window pane.

5. The arrangement according to claim 4, wherein a drain means is formed between a portion of the means for forming the outer covering, the upper flange, and the moulding.

6. The arrangement according to claim 5, wherein the means for forming an outer covering is an outer roof panel of the vehicle, and the means for defining an inner member of the vehicle is a roof frame element.

7. The arrangement according to claims 2 or 3, wherein an elastic sealing means is mounted on a free end of the moulding extending over an edge of the window pane, with the sealing means resting on the window pane.

8. The arrangement according to claims 2 or 3, wherein a drain means is formed between a portion of the means for forming the outer covering, the upper flange, and the moulding.

* * * * *